US009734522B2

(12) United States Patent
Slocum et al.

(10) Patent No.: US 9,734,522 B2
(45) Date of Patent: Aug. 15, 2017

(54) MOBILE SOLUTION FOR PURCHASE ORDERS

(71) Applicant: Wal-Mart Stores, Inc., Bentonville, AR (US)

(72) Inventors: Sean Slocum, Bentonville, AR (US); Kyle Reed, Bentonville, AR (US); Ramesh Janjyam, Rogers, AR (US); Gregory Voss, Rogers, AR (US); Ian Cross, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 353 days.

(21) Appl. No.: 14/637,210

(22) Filed: Mar. 3, 2015

(65) Prior Publication Data
US 2015/0248714 A1 Sep. 3, 2015

Related U.S. Application Data

(60) Provisional application No. 61/947,270, filed on Mar. 3, 2014.

(51) Int. Cl.
*G07F 19/00* (2006.01)
*G06Q 30/04* (2012.01)
*G06Q 30/06* (2012.01)

(52) U.S. Cl.
CPC ......... *G06Q 30/04* (2013.01); *G06Q 30/0635* (2013.01)

(58) Field of Classification Search
CPC ... G06Q 10/087; G06Q 30/04; G06Q 30/0601
(Continued)

(56) References Cited

U.S. PATENT DOCUMENTS

| 5,960,411 A | 9/1999 | Hartman |
| 7,366,770 B2 | 4/2008 | Hancock |
| 7,620,645 B2 | 11/2009 | Gaurav |

(Continued)

FOREIGN PATENT DOCUMENTS

| WO | 0235753 | 5/2002 |
| WO | 2004092892 | 10/2004 |
| WO | 20060120732 | 11/2006 |
| WO | 2007100423 | 9/2007 |
| WO | 20120089085 | 8/2012 |

OTHER PUBLICATIONS

Curdbee; 'Online Billing Software for Small Businesses and Freelancers;' pp. 1-7; Archived Apr. 12, 2012.
(Continued)

*Primary Examiner* — Hunter Wilder
*Assistant Examiner* — Joseph Mutschler
(74) *Attorney, Agent, or Firm* — Fitch, Even, Tabin & Flannery LLP

(57) ABSTRACT

Embodiments include methods and devices for creating an electronic invoice file using a baseline electronic purchase order file. The methods and devices can receive data representing an electronic purchase order file, comprising a plurality of fields of information. The methods and devices can also confirm that the received electronic purchase order file, was received from a valid retail trading partner, the format of the received electronic purchase order file is consistent with the format of the baseline electronic purchase order file, and the fields of the received electronic purchase order file are consistent with the fields in the baseline electronic purchase order file, in a single step, by applying a hashing function to the data representing the baseline electronic purchase order file and received electronic purchase order file. The methods and devices can also create an electronic invoice file, using a plurality of fields from the electronic purchase order file.

10 Claims, 8 Drawing Sheets

(58) Field of Classification Search
USPC .......................................................... 705/34
See application file for complete search history.

(56) References Cited

U.S. PATENT DOCUMENTS

| | | |
|---|---|---|
| 7,716,086 B2 | 5/2010 | Anderson |
| 7,925,886 B2 | 4/2011 | Lott |
| 8,566,182 B2 | 10/2013 | Brower |
| 2011/0191196 A1 | 8/2011 | Orr |
| 2011/0191218 A1 | 8/2011 | Muir |
| 2011/0276419 A1 | 11/2011 | Johnson |
| 2012/0011071 A1 | 1/2012 | Pennock |
| 2012/0089521 A1 | 4/2012 | Abrevaya |
| 2012/0109672 A1 | 5/2012 | Pitroda |
| 2012/0173384 A1 | 7/2012 | Herrmann |
| 2012/0226540 A1 | 9/2012 | Batalion |
| 2012/0290415 A1 | 11/2012 | Itwaru |

OTHER PUBLICATIONS

Magento; 'Magento Mobile—Put Your Store in the Hands of Customers;' Archived Apr. 2012 http://web.archive.org/web/20120423234735/http://www.magentocommerce.com/product/mobile.

Mallat, Niina and Tuunainen, Virpi Kristiina; 'Exploring Merchant Adoption of Mobile Payment Systems: An Empirical Study;' e-Service Journal; Winter 2008; pp. 24-57; vol. 6; No. 2.

PCT; App. No. PCT/US2015/018463; International Search Report mailed Jun. 19, 2015.

PCT; App. No. PCT/US2015/018463; Written Opinion mailed Jun. 19, 2015.

SAP-Business One Software; 'Get Growing-with out affordable, scalable small business software;' pp. 1-2; Archived Apr. 12, 2012.

Zoho CRM; 'Zoho CRM—Mobile Edition;' Archived Apr. 2012 http://web.archive.org/web/20121215034646/http://www.zoho.com/crm/mobile.

| | | | |
|---|---|---|---|
| Inbox 502 | | | |
| 512 — Filter Items . . . | | | 508 |
| 506 | | | |
| 510 — PO# 45687922 | COST | TIME | > |
| 504 — Playground Set, | $5,000.00 | 11:04AM | |
| PO# 45687923 | COST | TIME | > |
| Patio Set, | $4,001.00 | 11:05 AM | |
| PO# 45687924 | COST | TIME | > |
| Hot Wheels Race Track, | $6,002.00 | 11:06 AM | |
| PO# 45687925 | COST | TIME | > |
| Fishing Starter Kit, | $1,003.00 | 11:07 AM | |
| PO# 45687926 | COST | TIME | > |
| Party Platter, | 44,004.00 | 11:08 AM | |
| PO# 45687927 | COST | TIME | > |
| Grill Package, | 5,005.00 | 11:09 AM | |
| PO# 45687928 | COST | TIME | > |
| Cell Phone Package, | $6,006.00 | 11:10 AM | |
| PO# 45687929 | COST | TIME | > |
| Gaming Package, | $7,007.00 | 11:11 AM | |
| PO# 45687930 | COST | TIME | > |
| Basketball Package, | $9,008.00 | 11:12 AM | |
| PO# 45687931 | COST | TIME | > |
| Bedroom Package, | $5,009.00 | 11:13 AM | |
| PO# 45687932 | COST | TIME | > |
| Cleaning Package | $1,010.00 | 11:14 AM | |

FIG. 5

| PO List | | PO Details | |
|---|---|---|---|
| DATE1 | | PO Number | 7900220640 |
| 7500320840 | > | PO Date | 12/27/2010 |
| 9800028517 | > | Ship Date | 12/28/2010 |
| 7500320842 | > | Cancel Date | 01/03/2011 |
| 7500320843 | > | Order Type | 0003 |
| 7500320844 | > | Department | 00095 |
| 7500320845 | > | Event | Replenish |
| 7500320846 | > | Payment Terms | NET 25 |
| DATE2 | | F.O.B. | Prepaid by Seller |
| 7500320840 | > | Carrier | Vendor Route |
| 9800028517 | > | Ship Point | JALANDHAR RB PB |
| 7500320842 | > | | |
| 7500320843 | > | Address | |
| 7500320844 | > | Ship To | |
| 7500320845 | > | BHARTI WAL-MART PVT LTD 740WSM DIS | |
| 7500320846 | > | CHANDIGARH PATIALA RD VILLAGE, PO BANUR, | |
| DATE3 | | TEHASIL, RAJPURA, PATIALA, PB, 140601, IN GLN | |
| 7500320840 | > | ILN Address:8903206000176 | |
| 9800028517 | > | Bill To | WAL-MART Stores, INC., |
| | | | 702 S.W. EIGHT ST. |
| | | | BENTONVILLE, AR 72716 US |

FIG. 6

PO Details

Supplier Details — 702
- Supplier Name: SHAKTI BHOG FOODS LTD.
- Supplier Number: 9060749

Line Details — 704

706:

001
- UPC: 8906000151174
- Supplier Stock: 8906000151174
- Quantity Ordered: 780
- Cost: 94.5000
- Extended Cost: 78710.00
- Item Description: SHAKTI BHOG ATTA 002
- UPC: 8906000151174
- Supplier Stock: 8906000151174
- Quantity Ordered: 780
- Cost: 94.5000
- Extended Cost: 78710.00
- Item Description: SHAKTI BHOG ATTA 003
- UPC: 8906000151174
- Supplier Stock: 8906000151174
- Quantity Ordered: 780
- Cost: 94.5000

PO List — 708

DATE1 — 710a
- 708a: 7500320840
- 708b: 9800028517
- 708c: 7500320842
- 708d: 7500320843
- 708e: 7500320844
- 708f: 7500320845 — 710b
- 708g: 7500320846

DATE2
- 708h: 7500320840
- 708i: 9800028517
- 708j: 7500320842
- 708k: 7500320843
- 708l: 7500320844
- 708m: 7500320845 — 710c
- 708n: 7500320846

DATE3
- 708o: 7500320840
- 708p: 9800028517

FIG. 7

MOBILE SOLUTION FOR PURCHASE ORDERS

This application claims the benefit of U.S. Provisional Application No. 61/947,270 filed Mar. 3, 2014, entitled MOBILE SOLUTION FOR PURCHASE ORDERS, for Slocum et al., which is incorporated in its entirety herein by reference.

TECHNICAL FIELD

Example embodiments described herein relate to systems and methods for converting an electronic purchase order to an electronic invoice.

BACKGROUND

There is a growing trend among users of mobile electronic devices (e.g., laptop computers, netbooks, smart phones, personal digital assistants, tablets etc.) to use native applications to access the same content hosted on a company's mobile website, instead of using the mobile website itself. This trend is driven by users' desire for a more user-friendly experience, and access to material without having to search through multiple webpages.

Mobile websites are often difficult to navigate, thereby increasing the click through rate (CTR) required to access certain content on a mobile website. Native applications reduce CTRs by displaying icons to a user that when selected, give the user immediate access to the same content that is hosted on a company website.

SUMMARY

In one disclosed embodiment, a method for creating an electronic invoice using a baseline electronic purchase order is disclosed. The method comprises receiving data representing an electronic purchase order from a computing device of a retail store, the electronic purchase order comprising a plurality of fields of information. The method also comprises confirming that the received electronic purchase order was received from a valid retail trading partner, the format of the received electronic purchase order is consistent with the format of the baseline electronic purchase order, and the fields of the received electronic purchase order are consistent with the fields in the baseline electronic purchase order, in a single step, by comparing the output values produced by a hashing function applied to the data representing the baseline electronic purchase order and the received electronic purchase order. If the output values are the same, then the received electronic purchase order is determined to be received from a valid retail trading partner, the format of the received electronic purchase order is determined to be consistent with the format of the baseline electronic purchase order, and the fields of the received electronic purchase order are determined to be consistent with the fields in the baseline electronic purchase order. The method further comprises creating the electronic invoice, including creating fields of the electronic invoice using a plurality of fields from the electronic purchase order.

In another disclosed embodiment, an electronic device includes one or more memories, one or more processors, and instructions stored on the one or more memories. The instructions, when executed by the one or more processors, cause the mobile computing device to perform the steps of receiving data representing an electronic purchase order file from a computing device of a retail store, the electronic purchase order file comprising a plurality of fields of information, and confirming that the received electronic purchase order file was received from a valid retail trading partner, the format of the received electronic purchase order file is consistent with the format of the baseline electronic purchase order file, and the fields of the received electronic purchase order file are consistent with the fields in the baseline electronic purchase order file, in a single step. The steps further include comparing the output values produced by a hashing function applied to the data representing the baseline electronic purchase order file and the received electronic purchase order file. If the output values are the same, then the received electronic purchase order file is determined to be received from a valid retail trading partner, the format of the received electronic purchase order file is determined to be consistent with the format of the baseline electronic purchase order file, and the fields of the received electronic purchase order file are determined to be consistent with the fields in the baseline electronic purchase order file. The steps also include creating the electronic invoice file, including creating fields of the electronic invoice file using a plurality of fields from the electronic purchase order file.

BRIEF DESCRIPTION OF THE DRAWINGS

FIG. 5 is an image of an exemplary mobile computing device displaying a list of previously viewed and unviewed electronic purchase order files.

FIG. 6 is an image of an exemplary mobile computing device displaying a list of electronic purchase order files and electronic purchase order file details.

FIG. 7 is an image of an exemplary mobile computing device displaying a list of electronic purchase order files and electronic purchase order file details.

DETAILED DESCRIPTION

Figure 1:
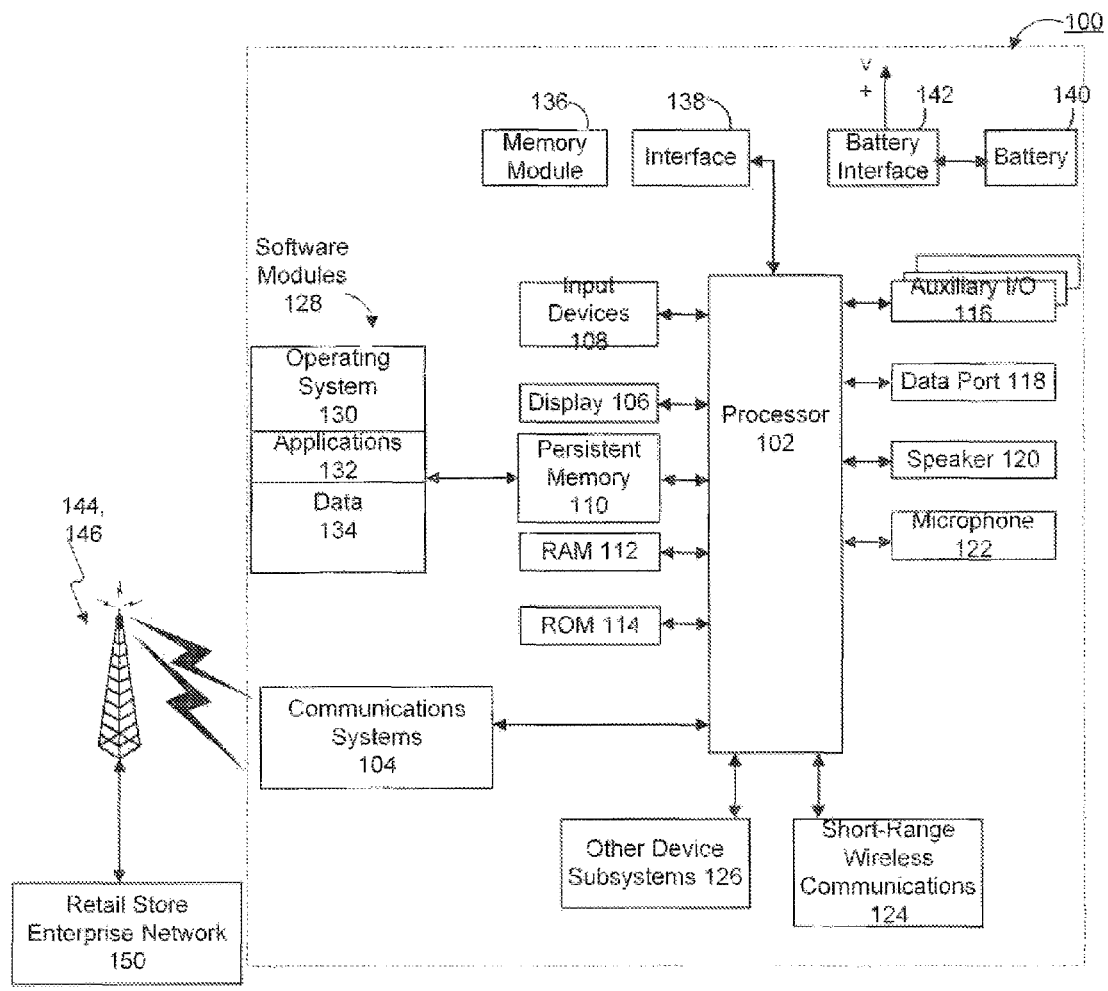
FIG. 1 is a block diagram illustrating an exemplary system for creating an electronic invoice file from an electronic purchase order file consistent with the present disclosure.

Reference will now be made in detail to exemplary embodiments, which are illustrated in the accompanying drawings.

Again, there is a growing trend among users of mobile electronic devices (e.g., laptop computers, netbooks, smart phones, personal digital assistants, tablets etc.) to use native applications to access the same content hosted on a company's mobile website, instead of using the mobile website itself. This trend is driven by users' desire for a more user-friendly experience, and access to material without having to search through multiple webpages. Mobile websites are often difficult to navigate, thereby increasing the click through rate (CTR) required to access certain content on a mobile website. Native applications reduce CTRs by displaying icons to a user that when selected, give the user immediate access to the same content that is hosted on a company website. For example, a retail store supplier might have a mobile website and a native application that both provide users with access to information about which products the retail store supplier has in stock. While the mobile website often requires a user to enter a Uniform Resource Locator (URL) to open a webpage and then search through multiple webpages to find the items that they want, native applications organize the data hosted on the supplier's website in such a way that the items can easily be searched and selected without having to open or scan through multiple webpages. For instance if a user is looking for a lamp on a mobile website, they might have to open a webpage that displays all of the furniture, then select lamps, and then further narrow the search by selecting the type of lamp they are looking for. As a result the user will have opened three different webpages. A native application however can display the information instantaneously, because the same data that is hosted on the website is stored locally on the device.

Some systems have adopted native mobile applications, in order to simplify the process of executing transactions with customers, and to increase company visibility and marketability. Retailers in particular have seen an increase in sales after developing native mobile applications for mobile computing devices. For example, online retail stores enable customers with mobile phones to purchase items on the go. However, rarely if ever, are native mobile applications developed, for use between retail store suppliers and retail stores.

One of the reasons why native mobile applications have not been created for this purpose is because of the computational complexity involved in creating an electronic invoice file from an electronic purchase order file. The current practice of creating an electronic invoice file from an electronic purchase order file typically requires a retail store supplier to: receive an electronic purchase order file, confirm the retail store as a valid trading partner, confirm that the structure of the electronic purchase order file adheres to an agreed-upon standard between the retail store and retail store supplier, and confirm that the fields of the electronic purchase order file conform to an agreed-upon standard. After the confirmation steps, the system has to create an intermediary file that translates the electronic purchase order file into a format that can be imported into the back-end business system of the supplier company. Once the intermediary file is imported into the back-end business system, the back-end business system creates an electronic invoice file by performing the exact opposite process. As a result the entire process of receiving an electronic purchase order file and converting it to an electronic invoice file can involve anywhere between five to eight steps.

The approach outlined above is not only time consuming, but also requires a lot of memory and processor resources. Modern desktop computers require minimal processing power and time to execute these operations because they contain more powerful processors than mobile computing devices, and they are not constrained by battery power. Mobile computing devices however, have smaller processors and are battery-constrained, thereby requiring a unique approach to convert an electronic purchase order file into an electronic invoice file.

The current state-of-the-art process of converting an electronic purchase order file to an electronic invoice file involves automating the process described above by using a "script." A script is a computer program language that enables one or more applications stored on a computing device to share and execute data. The problem with this approach, however, is that more than one application has to be running in order for the conversion to take place. This approach results in an inefficient use of computational resources thereby depleting the battery power at a much faster rate than a single native mobile application designed to accomplish the same task.

Hardware and software solutions exist that can be used to minimize the number of steps involved in the process of converting an electronic purchase order file to an electronic invoice file. Functions can be applied to instructions running on one or more processors in a mobile computing device, to enable a user to convert an electronic purchase order file into an electronic invoice file in a single step, by combining several steps in the conversion process. Furthermore the solutions proposed herein, help create an environment in which retailers can partner with suppliers who do not traditionally have access to broadband Internet. For instance, in countries like India where 75% of the citizens have access to mobile phones, but only 13% have access to broadband Internet, a native application for mobile computing devices would enable a greater number of suppliers to partner with large retail companies. As a result a more efficient and competitive marketplace can be established thereby increasing revenues for retailers, and providing jobs for citizens.

In one embodiment, a method for converting an electronic purchase order file (which may be generally referred to as an electronic purchase order) to an electronic invoice file (which may be generally referred to as an electronic invoice) in response to a single user input is provided. An electronic purchase order file is an electronic document or file comprising one or more fields providing detailed information about a collection of items requested from a supplying entity (i.e., retail store supplier) by a requesting entity (e.g., a retail store). The retail store and retail store supplier can be referred to as "trading partners." The electronic purchase order file can be an Extensible Markup Language (XML) file, Electronic Data Interchange (EDI) file, text file, spreadsheet, etc. The electronic purchase order file can comprise fields such as, for example, a unique code assigned to the retail store that sent the electronic purchase order file, a description of the requested item(s), the quantity of items requested, a number associated with the electronic purchase order file (e.g., a purchase order number), a number associated with each item (i.e., item number), and other detailed information regarding the items in the document. The electronic purchase order file can be converted to an electronic invoice file by confirming that the retail store that sent the electronic purchase order file is a valid trading partner, confirming that the electronic purchase order file conforms to a format agreed upon between the retail store and retail store supplier, and applying business requirements to the data in the electronic purchase order file to create an electronic invoice file. The business requirements can include information indicating what information should be extracted from the electronic purchase order file and included in the invoice file. For example, some retail stores might request that the purchase order number not be included in the invoice file. In other embodiments, the business requirements can include the sales tax associated with the sale of an item in a state, or the Value Added Tax (VAT) associated with the sale of the item in another country.

One aspect of the embodiments is the combination of the steps of confirming a retail store as a valid trading partner, and confirming that the electronic purchase order file and fields in the electronic purchase order file conform to a specific format by using a hashing function. The hashing function can produce a unique value that can be used by a mobile computing device to execute the confirmation steps by comparing a baseline electronic purchase order file received from a retail store to any subsequent electronic purchase order file received from the same retail store. The baseline electronic purchase order file can be an electronic purchase order file that conforms to an agreed-upon electronic purchase order file format, and contains a set of fields arranged in the electronic purchase order file according to a format agreed upon by the retail store supplier and the retail store before any transactions take place.

In some embodiments, a trading partner can create a new electronic purchase order file by adding, removing, and/or merging fields to an existing baseline electronic purchase order file. For instance a retail store supplier might create a new electronic purchase order file by adding a new field to an electronic purchase order file for accounting purposes. As an example, a retail store supplier might send a new electronic purchase order file to the retail store containing a field for retail store discounts, thereby reducing the amount of time a retail store supplier mobile computing device has to spend looking up discount information for a retail store. In some embodiments the trading partners could decide to switch electronic purchase order file formats. For example, instead of using a XML format the trading partners might agree to use an EDI format. In such a case, one of the two trading partners will have to send an updated electronic purchase order file to the other trading partner, and the trading partners must agree to the changes made to the electronic purchase order file. Alternatively a new electronic purchase order file can be uploaded to a server hosted by a trading partner or a third party server, and the trading partners can agree to the changes and download the latest electronic purchase order file.

The hashing function produces a unique output value for an electronic purchase order file associated with a retail store. In other words, the application of the hashing function to an electronic purchase order file conforming to an agreed-upon format between retail trading partners, will produce a value that is unique to those trading partners. The output of the hashing function will be the same each time a retail store supplier mobile computing device applies the function to an electronic purchase order file received from a given retail store, as long as the format of the file is the same. This will not be true however, if the format electronic purchase order file has been changed. For example, if a retail store supplier mobile computing device receives an electronic purchase order file containing a field that was not included in the baseline electronic purchase order file agreed upon between the trading partners, then the hashing function will generate a value that is different than the value produced by hashing the baseline electronic purchase order file. This indicates that a change has been made to the electronic purchase order file format. In some embodiments, the hashing function output value produced can be mapped to an error message indicating what changes have been made to the electronic purchase order file. The hashing function output value can be, for example, a string of binary digits, a hexadecimal number, or an alphanumeric value.

In some embodiments, a paper purchase order can be scanned into a mobile computing device and converted to an electronic purchase order file. In other embodiments a photograph of a paper-based purchase order can be taken and converted into an electronic purchase order file. Alternatively a QR code or barcode can be scanned by a mobile computing device to generate an electronic purchase order file.

The following detailed description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications can be made to the components illustrated in the drawings, and the example methods described herein can be modified by removing, substituting, reordering, or adding steps to the disclosed methods. Accordingly, the foregoing general description and the following detailed description are example and explanatory only and are not limiting. Instead, the proper scope is defined by the appended claims.

In addition, numerous specific details are set forth in order to provide a thorough understanding of the example embodiments described herein. However, it will be understood by those of ordinary skill in the art that the example embodiments described herein can be practiced without these specific details. Furthermore, well-known methods, procedures and components have not been described in detail so as not to obscure the example embodiments described herein.

A single form of a term in this disclosure includes the terms' plural form, and vice versa. The indefinite article (a or an) and the definite article (the), when used in the specification and claims, is meant to include one or more than of the objects, activities or steps that it might qualify, unless otherwise expressly indicated to the contrary. For example, "a" processor can be one or more than one processor.

Reference is now made to FIG. 1, which illustrates in detail an example mobile computing device 100 in which example embodiments can be applied. Mobile computing device 100 is a two-way mobile computing device having data and voice communication capabilities, and the capability to communicate with other computer systems, for example, via the Internet. Depending on the functionality provided by mobile computing device 100, in various example embodiments mobile computing device 100 can be a handheld device, a multiple-mode mobile computing device configured for both data and voice communication, a smartphone, a mobile telephone, a netbook, a gaming console, a tablet, or a PDA (personal digital assistant) enabled for wireless communication.

Mobile computing device 100 includes a case (not shown) housing the components of mobile computing device 100. In some example embodiments mobile computing device 100 has a rectangular shape with two planar sides, although other configurations may be adopted. The internal components of mobile computing device 100 can, for example, be constructed on a printed circuit board (PCB). The description of mobile computing device 100 herein mentions a number of specific components and subsystems. Although these components and subsystems can be realized as discrete elements, the functions of the components and subsystems can also be realized by integrating, combining, or packaging one or more elements in any suitable fashion.

Mobile computing device 100 includes a controller including at least one processor 102 (such as a microprocessor), which controls the operation of mobile computing device 100. Processor 102 can be one or more microprocessors, field programmable gate arrays (FPGAs), digital signal processors (DSPs) capable of executing particular sets of instructions, or other circuit capable of electrically coupling and controlling the device subsystems. Processor 102 interacts with device subsystems such as a communication system 104 for exchanging radio frequency signals with a wireless network (for example Wide Area Network (WAN)

144 and/or Public Land Mobile Network (PLMN) 146) to perform communication functions.

Processor 102 also interacts with additional device subsystems including a display 106 such as a liquid crystal display (LCD) screen or any other appropriate display, input devices 108 such as a keyboard and control buttons, persistent memory 110, random access memory (RAM) 112, read only memory (ROM) 114, auxiliary input/output (I/O) subsystems 116, a data port 118 such as a conventional serial data port or a Universal Serial Bus (USB) data port, a speaker 120, a microphone 122, a short-range wireless communications subsystem 124 (which can employ any appropriate wireless (for example, RF), optical, or other short range communications technology), and other device subsystems generally designated as 126. Some of the subsystems shown in FIG. 1 perform communication-related functions, whereas other subsystems can provide "resident" or on-device functions.

On one planar side of mobile computing device 100, display 106 can be realized as a touch-sensitive display in some example embodiments. The touch-sensitive display can be constructed using a touch-sensitive input surface coupled to an electronic controller which overlays the visible element of display 106. The touch-sensitive overlay and the electronic controller provide a touch sensitive input device and processor 102 interacts with the touch-sensitive overlay via the electronic controller. In some example embodiments the touch-sensitive overlay may extend beyond a display area of display 106 to the edges of the side of mobile computing device 100.

Communication system 104 includes one or more communication systems for communicating with wireless WAN 144 and wireless access points within the wireless network. The particular design of communication system 104 depends on the wireless network in which mobile computing device 100 is intended to operate. Mobile computing device 100 can send and receive communication signals over the wireless network after the required network registration or activation procedures have been completed.

Processor 102 operates under stored program control and executes software modules 128 stored in a tangible non-transitory computer-readable storage medium such as persistent memory 110, which can be a flexible disk, a hard disk, a CD-ROM (compact disk-read only memory), a MO (magneto-optical) disk, a DVD-ROM (digital versatile disk-read only memory), a DVD RAM (digital versatile disk-random access memory), or a semiconductor memory. Software modules 128 can also be stored in a computer-readable storage medium such as ROM 114, or any appropriate persistent memory technology, including EEPROM, EAROM, and FLASH. These computer-readable storage media store computer-readable instructions for execution by processor 102 to perform a variety of functions on mobile computing device 100.

Software modules 128 can include operating system 130, used to control operation of mobile computing device 100. Additionally, software modules 128 can include applications 132 for providing additional functionality to mobile computing device 100. Applications 132 can further include a range of applications, including, for example, e-mail messaging application, address book, spell check application, text prediction application, notepad application, Internet browser application, voice communication (e.g., a telephony) application, mapping application, or a media player application, or any combination thereof. Each of Applications 132 can include layout information defining the placement of particular fields and graphic elements (for example, text fields, input fields, icons, etc.) in the user interface (e.g., display 106) according to the application.

In certain example embodiments, data 134 also includes service data including information required by mobile computing device 100 to establish and maintain communication with the wireless network (for example WAN 144 and/or PLMN 146).

In some example embodiments, auxiliary input/output (I/O) subsystems 116 include an external communication link or interface, for example, an Ethernet connection. In some example embodiments, mobile computing device 100 includes one or more sensors such as an accelerometer, GPS, temperature sensor, and pressure sensor. In some example embodiments, auxiliary I/O subsystems 116 can further include one or more input devices, including a pointing or navigational tool such as an optical trackpad, clickable trackball, scroll wheel or thumbwheel, or one or more output devices, including a mechanical transducer such as a vibrator for providing vibratory notifications in response to various events on mobile computing device 100 (for example, receipt of an electronic message or incoming phone call), or for other purposes such as haptic feedback (touch feedback).

In some example embodiments, mobile computing device 100 also includes one or more removable memory modules 136 (typically including FLASH memory) and a memory module interface 138. Among possible functions of removable memory module 136 is to store information used to identify or authenticate a subscriber or the subscriber's account to a wireless network (for example WAN 144 or PLMN 146). For example, in conjunction with certain types of wireless networks, such as GSM and successor networks, removable memory module 136 is referred to as a Subscriber Identity Module (SIM). Memory module 136 is inserted in or coupled to memory module interface 138 of mobile computing device 100 in order to operate in conjunction with the wireless network.

Mobile computing device 100 also includes a battery 140 which furnishes energy for operating mobile computing device 100. Battery 140 can be coupled to the electrical circuitry of mobile computing device 100 through a battery interface 142, which can manage such functions as charging battery 140 from an external power source (not shown) and the distribution of energy to various loads within or coupled to mobile computing device 100. A short-range wireless communications subsystem 124 may be included as an additional optional component that provides for communication between mobile computing device 100 and different systems or devices, which need not necessarily be similar devices. For example, short-range wireless communications subsystem 124 can include an infrared device and associated circuits and components, or a wireless bus protocol compliant mobile computing device such as a BLUETOOTH® communication module to provide for communication with similarly-enabled systems and devices.

A predetermined set of applications that control basic device operations, including data and possibly voice communication applications can be installed on mobile computing device 100 during or after manufacture. Additional applications or upgrades to Operating System 130 or Applications 132 can also be loaded onto mobile computing device 100 through the wireless network (for example WAN 144 and/or PLMN 146), auxiliary I/O subsystem 116, data port 118, short-range wireless communication subsystem 124, or other suitable subsystems 126. The downloaded programs or code modules can be permanently installed, for example, written into the persistent memory 110, or written into and executed from RAM 112 for execution by processor 102 at runtime.

Mobile computing device 100 may provide, for example, three modes of communication: a data communication mode, a voice communication mode, and a video communication mode. In the data communication mode, a received data signal such as an Electronic Data Interchange (EDI) message, a text message, an e-mail message, a Web page download, or an image file is processed by communication system 104 and input to processor 102 for further processing. For example, an EDI electronic purchase order file can be received and translated into an electronic invoice file, a downloaded Web page can be further processed by a browser application, an e-mail message can be processed by an e-mail message messaging application and output to display 106. A user of mobile computing device 100 can also compose data items, such as electronic purchase order files, electronic invoice files, and e-mail messages, for example, using the input devices, such as auxiliary I/O subsystem 116, in conjunction with display 106. These composed items can be transmitted through communication system 104 over the wireless network (for example WAN 144 or PLMN 146) to and from other networks (e.g. a Retail Store Enterprise Network 150) or systems. In the voice communication mode, mobile computing device 100 provides telephony functions and operates as a typical cellular phone. In the video communication mode, mobile computing device 100 provides video telephony functions and operates as a video teleconference terminal. In the video communication mode, mobile computing device 100 utilizes one or more cameras (not shown) to capture video of video teleconference.

Figure 2:
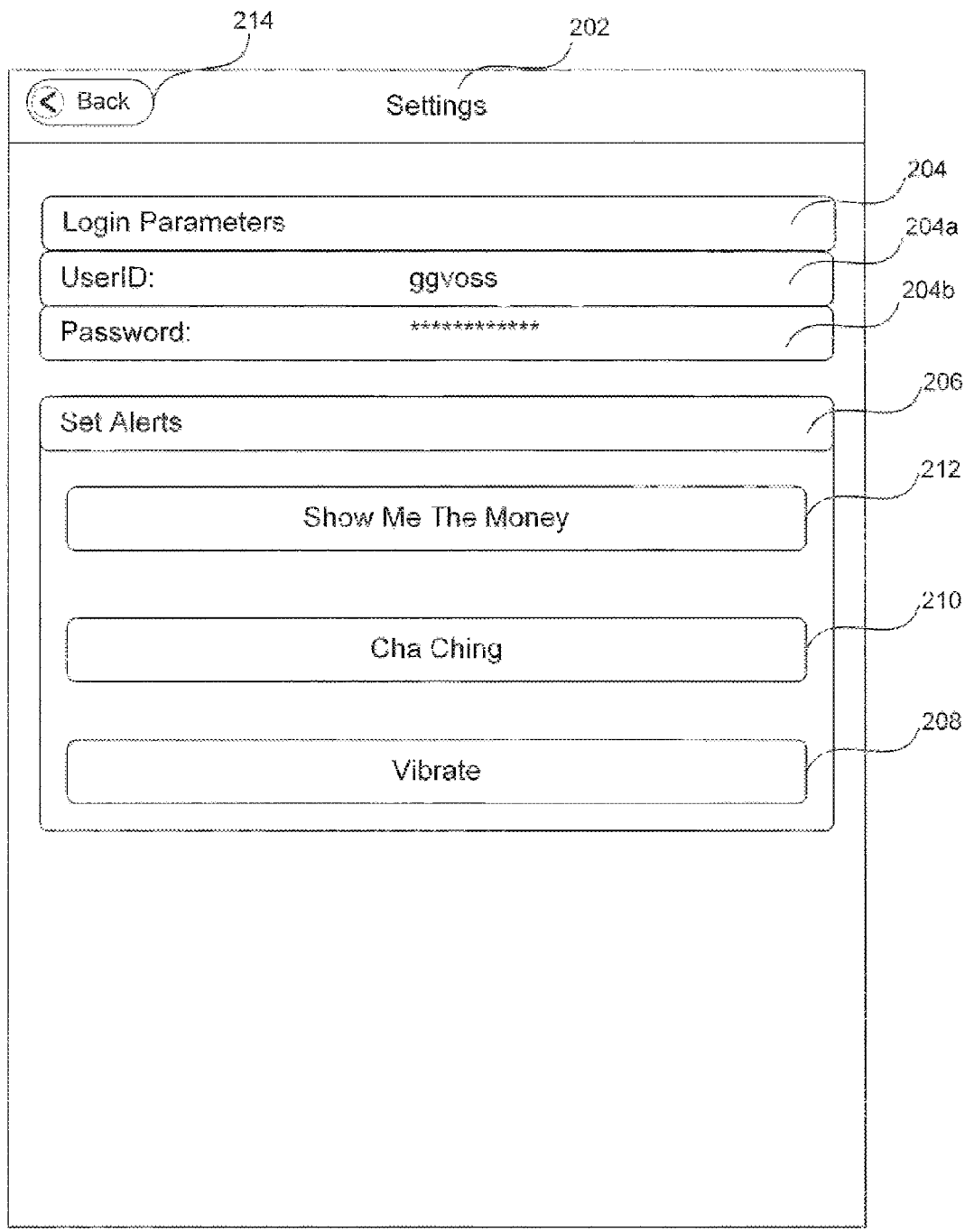
FIG. 2 is an image of an exemplary mobile computing device displaying alert buttons.

Referring now to FIG. 2, there is shown an exemplary image of a mobile computing device displaying settings 202 and alert buttons 208-212. Settings 202 can be an electronic banner indicating that settings associated with the device are currently being displayed. Settings 202 can include Login Parameters 204 and Set Alerts 206. Login Parameters 204 can include UserID 204a and Password 204b. UserID 204a can be a field configured to receive a string of alphanumeric characters representing the identification of a user account associated with mobile computing device 100. Password 204b can be a field configured to receive a string of alphanumeric characters that can be used by mobile computing device 100 to confirm the identification of the user account associated with mobile computing device 100. In some embodiments Login Parameters 204 can include additional fields including, but not limited to, the first name and last name of a user, an identification number associated with a user, an identification number associated with the store that a user works at, or other information that identifies a user. If a user selects alert button Vibrate 208, mobile computing device 100 can notify a user, by vibrating, when an electronic purchase order file has been received. If a user selects alert button Cha Ching 210, mobile computing device 100 can notify a user when an electronic purchase order file has been received by emitting a sound from speaker 120. If a user selects alert button Show Me The Money 212, mobile computing device 100 can notify a user when an electronic purchase order file has been received by displaying an image on the mobile computing device. In some embodiments the visual alert can be a picture associated with a retail store, a retail store computing device, or a user working at a retail store. Back 214 can be a button, that when selected, can invoke mobile computing device 100 to display other files stored on mobile computing device 100.

Figure 3:
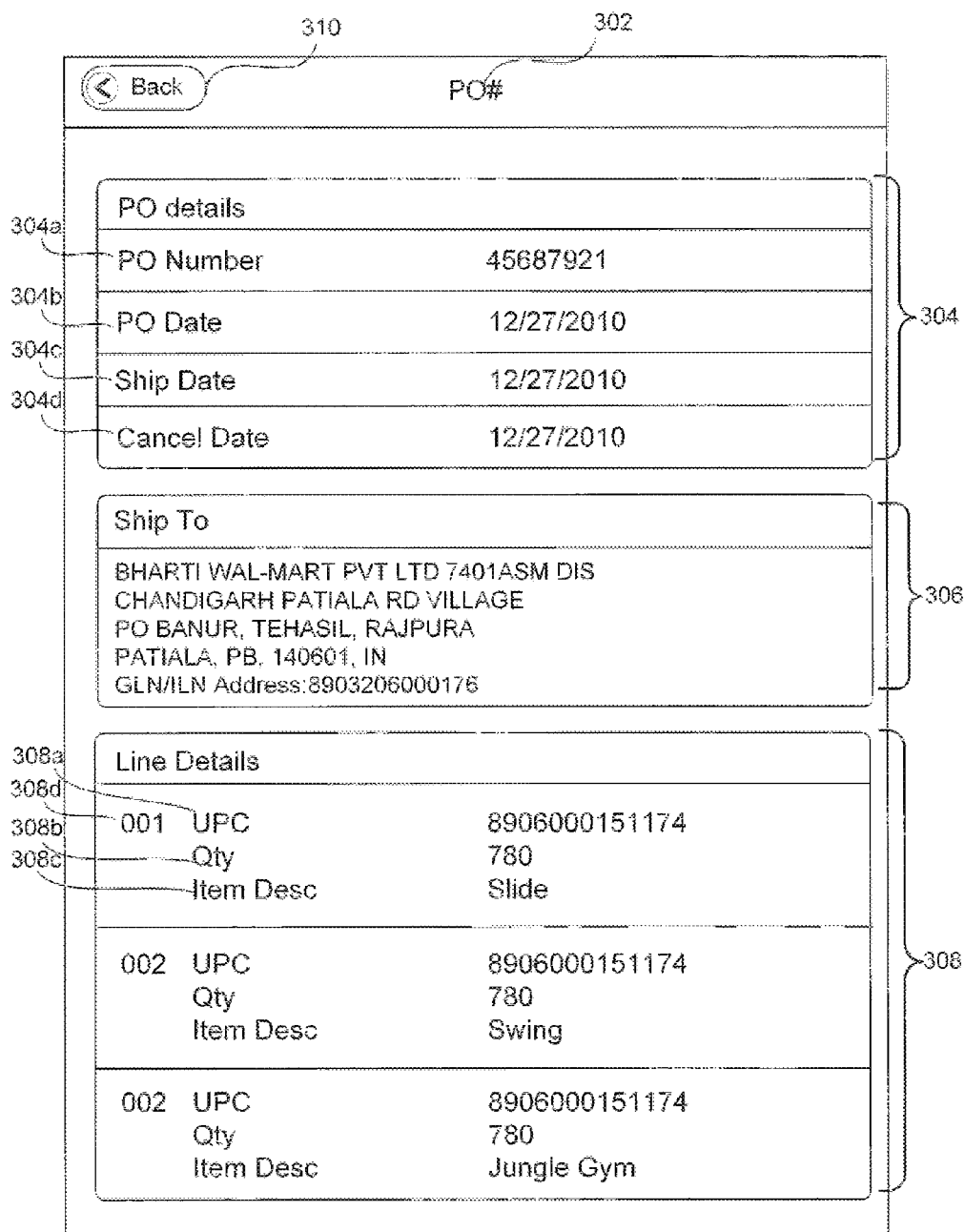
FIG. 3 is an image of an exemplary mobile computing device displaying an electronic purchase order file.

Referring now to FIG. 3, there is shown an exemplary image of a mobile computing device displaying an electronic purchase order file. PO# 302 can be an electronic banner indicating that an electronic purchase order file is currently being displayed. An electronic purchase order file can be comprised of the following fields: PO details 304, Ship To 306, and Line Details 308. PO details 304 can contain subfields: PO Number 304a, PO Date 304b, Ship Date 304c, and Cancel Date 304d. PO Number 304a can be a string of any alphanumeric characters associated with an electronic purchase order file. PO Date 304b can be the date the electronic purchase order file was received. Ship Date 304c can be the date when the items in Line Details 308 are shipped to the retail store address in Ship To 306. Cancel Date 304d can be the date after which the electronic purchase order file cannot be cancelled. Ship To 306 can be the name and address of the retail store that the items in Line Details 308 will be shipped to. Line Details 308 can be a list of the items to be shipped to the address in Ship To 306. Line Details 308 can contain subfields: UPC 308a, Qty 308b, and Item Desc 308c for each Line Item 308d in the list. UPC 308a can be the Universal Product Code of Line Item 308d. Qty 308b can be the quantity of Line Item 308d requested. Item Desc 308c can be a description of Line Item 308d. Line Item 308d can be an item requested by a retail store from a retail store supplier. Back 310 can be a button, that when selected, can invoke mobile computing device 100 to display an inbox with previously viewed and unviewed electronic purchase order files as shown in FIG. 5

Figure 4:
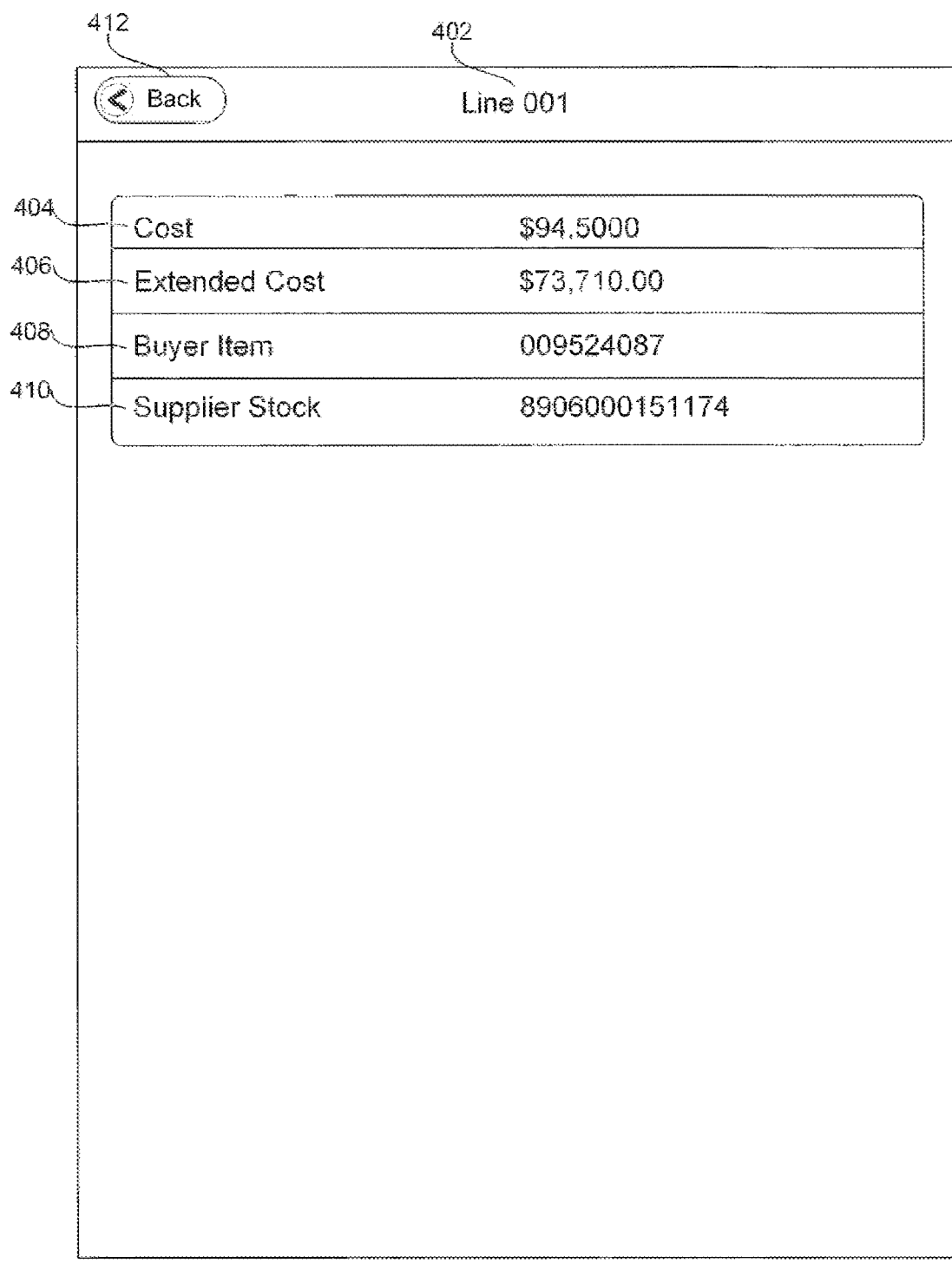
FIG. 4 is an image of an exemplary mobile computing device displaying detailed information about a line item.

Referring now to FIG. 4, there is shown an exemplary image of a mobile computing device displaying detailed information about a line item. Line 001 402 can be an electronic banner indicating that the details associated with a line item (e.g., Line Item 308d) are currently being displayed. Detailed information about a line item can comprise: Cost 404, Extended Cost 406, Buyer Item 408, and Supplier Stock 410. Cost 404 can be the cost of Line Item 308d. Extended Cost 406 can be Qty 308b multiplied by Cost 404. Buyer Item 408 can be a number assigned to Line Item 308d that uniquely identifies the item. Supplier Stock 410 can be the quantity of Line Item 308d that a retail store supplier has in stock. Back 412 can be a button, that when selected, can invoke mobile computing device 100 to display an electronic purchase order file as shown in FIG. 3.

Referring now to FIG. 5, there is shown an exemplary image of a mobile computing device displaying a list of previously viewed and unviewed electronic purchase order files. Inbox 502 can be an electronic banner indicating that a list of previously viewed and unviewed electronic purchase order files are currently being displayed. Item 504, can be the name of an item (e.g., a playground set) requested by the retail store. Cost 506 can be the amount of money a retail store supplier will charge a retail store for Item 504. Time 508 is a timestamp associated with the arrival of the electronic purchase order file at the mobile computing device. PO# 510, is the purchase order number assigned to an electronic purchase order file. PO# 510 can consist of alphanumeric characters and can be any length. A unique purchase order number can be generated by applying a hashing function to a timestamp associated with the time at which the electronic purchase order file is sent from a retail store device and: the retail store number, the retail store supplier number, and/or the item(s) requested in the electronic purchase order file. In other embodiments a random number can be created using a random number generator.

In other embodiments a user can search for electronic purchase order files using Filter Items 512. Electronic purchase order files can be filtered by: PO# 510, Item 504, or Time 508. Electronic purchase order files can also be found by filtering according to: retail store number, retail store name, item description, UPC code, or buyer item number. In some embodiments Boolean operators can also be applied to one or more search items.

Referring now to FIG. 6, there is shown an exemplary image of a mobile computing device displaying a list of electronic purchase order files and electronic purchase order file details. If mobile computing device 100 receives an operator input to display an electronic purchase order file, the electronic purchase order file is displayed, and may comprise a field PO Details 602 and subfields PO Number 604, PO Date 606, Ship Date 608, Cancel date 610, Order Type 612, Department 614, Event 616 (e.g., retail store stock needs to be replenished), Payment Terms 618, Free On Board (F.O.B) 620, Carrier 622, Ship Point 624, Ship To 626, Bill To 628. PO Number, 604, PO Date 606, Ship Date 608, and Cancel date 610 contain the same information presented in PO Number 304a, PO Date 304b, Ship Date 304c, and Cancel Date 304d of FIG. 3. Order Type 612 can be an alphanumeric string identifying the type of order being placed (e.g., bulk order). Department 614 can be an alphanumeric string identifying a department within a retail store (e.g., clothing department). Event 616 can be an alphabetic string describing the service requested by the retail store (e.g., replenish empty stock). Payment Terms 618 can be an alphanumeric string identifying a particular payment agreement between retail trading partners (e.g., payment on delivery). F.O.B 620 can be an alphabetic string indicating which retail partner will pay for shipping. Carrier 622 can be the shipping company that will transport the items between trading partners. Ship Point 624 can be an identification of the location to which the items will be delivered, such as a city in a state or district where a warehouse is located that supplies retail stores in the state or district. The warehouse can be a distribution center that receives bulk shipments of items from retail store suppliers, and that distributes those items to retail stores in a state or district. Ship To 626 can be the address of the retail store to which the items in the electronic purchase order file will be shipped. Bill To 628 can be the billing address of the entity that will pay for the items in the electronic purchase order file. PO List 630 can comprise a list of purchase order numbers PO# 630a-p. DATE 632a-c can be the date when mobile computing device 100 received an electronic purchase order file. In some embodiments, DATE 632a-c can be the date when the electronic purchase order files were created. The format of the date can be expressed in alphanumeric characters.

Referring now to FIG. 7, there is shown an image of an exemplary mobile computing device display showing a list of purchase orders and electronic purchase order file details. Supplier Name 702 can be the name of the retail store supplier. Supplier Number 704 can be an alphanumeric string associated with the retail store supplier. Line Details 706 comprises the same information presented in Line Details 306 of FIG. 3. PO List 708 can comprise a list of purchase order numbers PO# 708a-p. DATE 710a-c can be the date when mobile computing device 100 received an electronic purchase order file. In some embodiments, DATE 710a-c can be the date when the electronic purchase order files were created. The format of the date can be expressed in alphanumeric characters.

Figure 8:
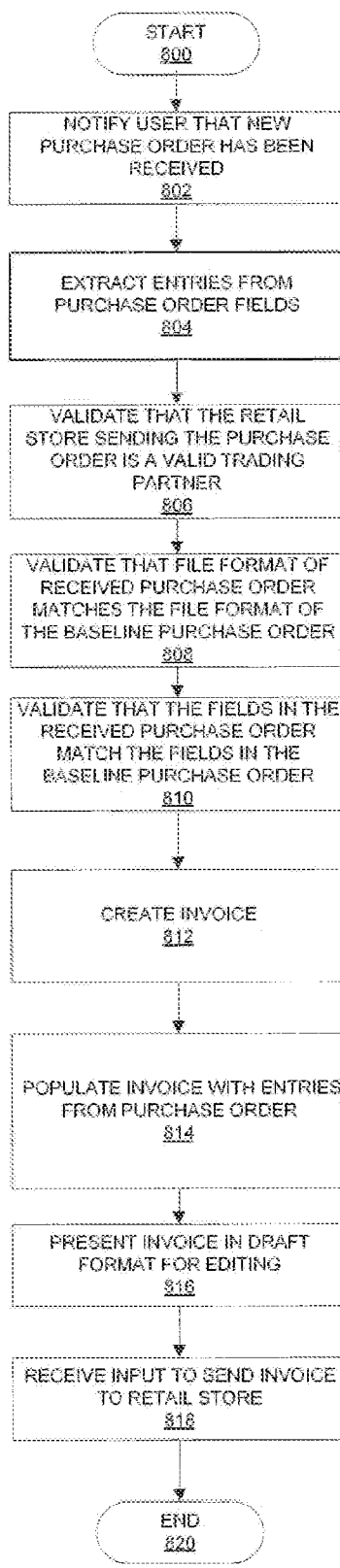
FIG. 8 is a flowchart illustrating steps in an exemplary method for creating an electronic invoice file from an electronic purchase order file consistent with the present disclosure.

FIG. 8 is a flowchart illustrating steps in an exemplary method 800 for creating an electronic invoice file from an electronic purchase order file consistent with the present disclosure. It will be readily appreciated by one of ordinary skill in the art that the illustrated procedure can be altered to delete steps, further include additional steps, or combine steps.

In step 802, mobile computing device 100 can provide a user with a notification, immediately after an electronic purchase order file has been received. In embodiments herein, a notification can be an auditory, visual, or haptic (e.g., vibration) alert. For example, notifications can be provided as shown in FIG. 2, which is an exemplary image of a mobile computing device displaying alert buttons on display 106. In some embodiments the alert can be an electronic purchase order file displayed immediately after it is received, as shown in FIG. 3. In other embodiments, mobile computing device 100 can also display detailed information about a line item, as shown in FIG. 4. Yet in other embodiments, a user can browse previously received electronic purchase order files, as shown in FIG. 5, that were not immediately displayed on the screen after the electronic purchase order file was received. Mobile computing device 100, in some embodiments, can display a list of electronic purchase order files, while simultaneously displaying the details of one or more electronic purchase order files as shown in FIGS. 6 and 7.

After a user has been notified that an electronic purchase order file has been received, mobile computing device 100 can extract data from the fields of the electronic purchase order file and store it in memory in step 804. Once the data has been stored, mobile computing device 100 can determine if the retail store that sent the electronic purchase order file is a valid trading partner in step 806.

Mobile computing device 100 can determine if a retail store is a valid trading partner by comparing an electronic value (e.g., bit string) associated with retail store information (i.e., a baseline electronic purchase order file associated with a retail store), to an electronic value (e.g., bit string) associated with the received electronic purchase order file. A baseline electronic purchase order file can be an electronic purchase order file conforming to an agreed upon electronic file format between a retail store and retail store supplier. The baseline electronic purchase order file can be comprised of one or more fields, including but not limited to, sender and receiver codes that uniquely identify the retail store and retail store supplier respectively. The baseline electronic purchase order file can also comprise other fields that have been agreed upon between the retail store and retail store supplier. The received electronic purchase order file can be comprised of the same fields as the baseline electronic purchase order file. The baseline electronic purchase order file may contain a value in the sender code field, but may not contain values in any of the other fields. After an electronic purchase order file is received, the values in the fields of the received electronic purchase order file may be removed, except for the sender code. Once the values have been removed from the received electronic purchase order file, the data representing the baseline electronic purchase order file and the received electronic purchase order file should be exactly the same. A hashing function can be used to confirm that the data representing the two electronic purchase order files is the same. The hashing function can generate a unique electronic output value (e.g., bit string) for each unique electronic input value (e.g., data representing an electronic purchase order file). Therefore, the mobile device can determine that the received electronic purchase order is a valid purchase order and/or if the output value of the hashing function is the same for the data representing the baseline electronic purchase order file and the received electronic purchase order file, then the data representing the two electronic purchase order files is the same. Thus the sender code in the received electronic purchase order file is the same as the sender code in the baseline electronic purchase order file, because the output value of the hashing function is the same for both electronic purchase order files, and both electronic purchase order files include a sender code. Thus mobile computing device 100 can confirm that the electronic purchase order file was received from a retail store whose identity is uniquely identified by the sender code in the baseline electronic purchase order file. Since the output value produced by the hashing function can be used to confirm the identity of the retail store that sent the electronic purchase order file, it can also be used to determine if the retail store is a valid trading partner. Mobile computing device 100 can determine if a retail store is a valid retail trading partner by comparing the output value produced by the hashing function to an electronic list of output values corresponding to valid trading partners. If the output value produced by the hashing function matches an output value on the list, then the retail store is a valid retail trading partner. If the output value does not match a value on the list, then the retail store is not a valid retail trading partner. In some embodiments a digital watermark can be used instead of a sender code.

In step 808 mobile computing device 100 can confirm that the format of the received electronic purchase order file matches the format of the baseline electronic purchase order file. In some embodiments the electronic purchase order file can have an Electronic Data Interchange (EDI) format, Extensible Markup Language (XML) format, Excel Spreadsheet format, regular Text format, or some combination of the above.

In some embodiments, the fields in the electronic purchase order file can comprise a purchase order number, electronic purchase order file date, item ship date, electronic purchase order file cancellation date, order type, retail store department, event type (e.g., retail store stock needs to be replenished), payment terms, free on board (f.o.b.) status, shipment carrier, shipment point, ship to address, bill to address, supplier name, supplier number, and/or line details.

In some embodiments, the hashing function can be a program that uses the binary values of the electronic purchase order file as an input, and produces a unique numeric output value for the electronic purchase order file. The hashing function produces the same output value each time it is applied to the same electronic purchase order file. The hashing function can generate the unique output value by executing a binary logical operation on the binary data of the electronic purchase order file and a unique identification number associated with mobile computing device 100. For example, the hashing function can apply a logical AND, OR, NOR, XOR, XNOR, and/or any other logical operation to the data of the electronic purchase order file and the identification number of mobile computing device 100 to create a unique output value. In some embodiments, the identification number can be the International Mobile Equipment (IMEI) number, and in other embodiments it can be the Mobile Equipment ID (MEID) number. The IMEI and MEID are unique numbers assigned to the hardware of each mobile computing device. For example, when a new mobile computing device is manufactured, a unique non-reusable number is assigned to the mobile computing device. Therefore a unique value can be produced when the hashing function performs a logical operation on the electronic purchase order file and the identification number assigned to mobile computing device 100. The same hashing function is applied to the baseline electronic purchase order file and the received electronic purchase order file.

In some embodiments the baseline electronic purchase order file can be stored on a secure retail store enterprise network computing device, and mobile computing device 100 can request a copy of the baseline electronic purchase order file from the secure retail store enterprise network computing device.

In some embodiments, mobile computing device 100 can confirm the format of the received electronic purchase order file by removing the values from all of the fields in the received electronic purchase order file, and comparing the output values of the hashing function produced by the input data representing the received electronic purchase order file and the baseline electronic purchase order file. If the values are the same, then the format of the received electronic purchase order file matches the format of the baseline electronic purchase order file.

In some embodiments the hashing function can be a Message Digest (MD) function or a Secure Hash Algorithm (SHA).

In step 810 mobile computing device 100 can confirm that the fields in the received electronic purchase order file match the fields in the baseline electronic purchase order file, by comparing the output value of the hashing function produced by the input data representing the received electronic purchase order file and baseline electronic purchase order file. In some embodiments the fields in the electronic purchase order file can comprise a: purchase order number, electronic purchase order file date, ship date, electronic purchase order file cancellation date, payment terms, shipment carrier, ship to address, bill to address, supplier name, supplier number, line details, etc. If the received electronic purchase order file includes, or does not include, a field that is not included in the baseline electronic purchase order file, then the output of the hashing function will be different when it is applied to the data representing the received electronic purchase order and the baseline electronic purchase order file.

In a some embodiments, steps 806, 808, and 810 can be combined by applying the hashing function to the data representing a received electronic purchase order file and comparing that value to the value produced by applying the hashing function to the data representing a baseline electronic purchase order file. If the values are the same, then the validity of the trading partner can be confirmed, the format of the received electronic purchase order file matches the format of the baseline electronic purchase order file, and all of the fields in the received electronic purchase order file match the fields in the baseline electronic purchase order file.

In step 812, mobile computing device 100 can create an electronic invoice file. For example, mobile computing device 100 can create an electronic invoice file by copying the values extracted from the received electronic purchase order file and storing them in the corresponding fields of a baseline electronic invoice file, thus populating the fields of the baseline electronic invoice to form an electronic invoice, step 814. For example the purchase order number associated with an electronic purchase order file can be stored in a corresponding purchase order number field in the baseline electronic invoice file.

After the electronic invoice file has been populated, the electronic invoice file is presented to the user in draft format in step 816. The electronic invoice file and/or the electronic purchase order can be edited by, adding, removing, combining, and/or editing the values in the fields of the electronic invoice file or electronic purchase order. For example, in some embodiments a user can, change the number of items that will be shipped to a retail store, change the price charged for an item, add a discount to the cost of an item, select a currency, etc.

In step 818, mobile computing device 100 can receive an input from a user to send the electronic invoice file to a retail store computing device.

In some embodiments, steps 804, 812, and 814 can occur concurrently with steps 806-810. For instance, as a chunk of data in the electronic purchase order file is being confirmed, by mobile computing device 100 in steps 806-810, if the chunk of data contains a field from the electronic purchase order field that contained an entry that was extracted in step 804, the extracted entry can be written into a memory register corresponding to the field in the electronic invoice file, as in step 814, while the field in the electronic invoice file is being written into memory (e.g., created), as in step 812. In this embodiment, the process of creating an electronic invoice file using an electronic purchase order file can be accomplished in a single step. Therefore in some embodiments, mobile computing device 100 can, alert a user when an electronic purchase order file is received, convert and display the electronic invoice file in a second step, and send the electronic invoice file in a third step. Thus mobile computing device 100 can convert an electronic purchase order file into an electronic invoice file in response to a single gesture input from a user.

Some or all of the methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, a DVD-ROM (digital versatile disk-read only memory), a DVD RAM (digital versatile disk-random access memory), or a semiconductor memory. Alternatively, the methods can be implemented in hardware components or combinations of hardware and software of a data processing apparatus, e.g., a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the preceding specification, the embodiments have been described with reference to specific exemplary embodiments. It will however, be evident that various modifications and changes can be made without departing from the broader spirit and scope of the exemplary embodiments as set forth in the claims that follow. The specification and drawings are accordingly to be regarded as illustrative rather than restrictive sense. Other embodiments of the present disclosure may be apparent to those skilled in the art from consideration of the specification and practice of the invention disclosed herein.

What is claimed is:

1. A method performed by a mobile computing device of a supplier to create an electronic invoice comprising:
receiving, at a native application on the mobile computing device of the supplier and from a computing device of a retail store:
data representing an electronic purchase order, the electronic purchase order comprising a plurality of fields of information; and
data identifying the computing device;
confirming, using the native application, that the received data representing the electronic purchase order represents a valid purchase order by confirming the received data representing the electronic purchase order was received from a valid retail trading partner, a format of the received electronic purchase order is consistent with a format of a baseline electronic purchase order, and the fields of the received electronic purchase order are consistent with the fields in the baseline electronic purchase order by:
comparing output values produced by a hashing function applied to data representing the baseline electronic purchase order to output values produced by the hashing function applied to the received data; and
determining, based on the comparing, whether:
the received data representing the electronic purchase order is received from a valid retail trading partner;
the format of the received electronic purchase order is consistent with the format of the baseline electronic purchase order; and
the fields of the received electronic purchase order are consistent with the fields in the baseline electronic purchase order;
creating, using the native application and if the received data representing the electronic purchase order is confirmed to represent the valid purchase order, the electronic invoice, including populating fields of a baseline electronic invoice using values from corresponding fields of the received electronic purchase order; and
transmitting, using the native application, the electronic invoice to the computing device of the retail store.

2. The method of claim 1, further comprising generating an alert after the data representing the electronic purchase order has been received.

3. The method of claim 1, further comprising displaying, on a display of the mobile computing device, the data representing the electronic purchase order after it has been received at the mobile computing device.

4. The method of claim 1, further comprising receiving input from a user to edit the electronic purchase order.

5. The method of claim 1, further comprising receiving input from a user to edit data of the electronic invoice file.

6. A mobile computing device of a supplier comprising:
a processor; and
a memory storing instructions which, when executed by the processor, cause a native application on the mobile computing device of the supplier to perform the steps of:
receiving, from a computing device of a retail store:
data representing an electronic purchase order, the electronic purchase order comprising a plurality of fields of information; and
data identifying the computing device;
confirming that the received data representing the electronic purchase order represents a valid purchase order by confirming the received data representing the electronic purchase order was received from a valid retail trading partner, a format of the received electronic purchase order is consistent with a format of a baseline electronic purchase order, and the fields of the received electronic purchase order are consistent with fields in the baseline electronic purchase order by:
  comparing output values produced by a hashing function applied to data representing the baseline electronic purchase order to output values produced by the hashing function applied to the received data; and
  determining, based on the comparing, whether:
    the received data representing the electronic purchase order is received from a valid retail trading partner;
    the format of the received electronic purchase order is consistent with the format of the baseline electronic purchase order;
    the fields of the received electronic purchase order are consistent with the fields in the baseline electronic purchase order;
creating the electronic invoice if the received data representing the electronic purchase order is confirmed to represent the valid purchase order, including populating fields of a baseline electronic invoice using values from corresponding fields of the received electronic purchase order; and
  transmitting the electronic invoice to the computing device of the retail store.

7. The mobile computing device of claim 6, wherein the instructions, when executed by the processor, further perform the step of: generating an alert after the data representing the electronic purchase order has been received.

8. The mobile computing device of claim 6, wherein the instructions, when executed by the processor, further perform the step of: displaying, on a display of the mobile computing device, the data representing the electronic purchase order after it has been received at the mobile computing device.

9. The mobile computing device of claim 6, wherein the instructions, when executed by the processor, further perform the step of: receiving input from a user to edit the electronic purchase order.

10. The mobile computing device of claim 6, wherein the instructions, when executed by the processor, further perform the step of: receiving input from a user to edit data of the electronic invoice file.

* * * * *